March 12, 1963 K. A. BRANDENBERG 3,080,887
FLUID PRESSURE-OPERATED MULTI-WAY VALVE
Filed March 6, 1961 3 Sheets-Sheet 1

INVENTOR.
KARL A. BRANDENBERG
BY
Gardner + Zimmerman
ATTORNEYS

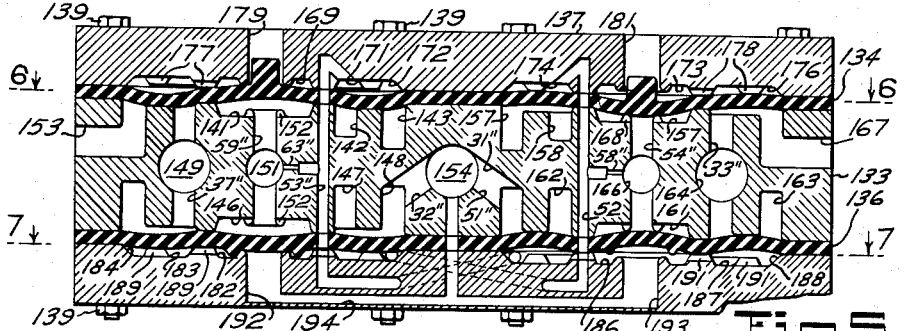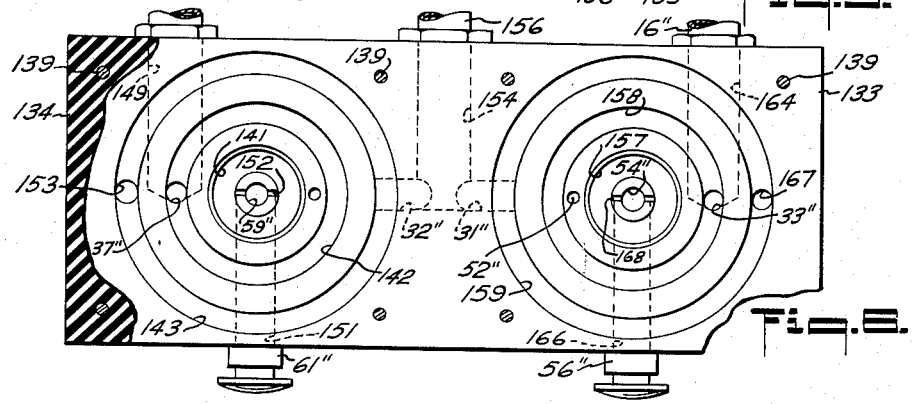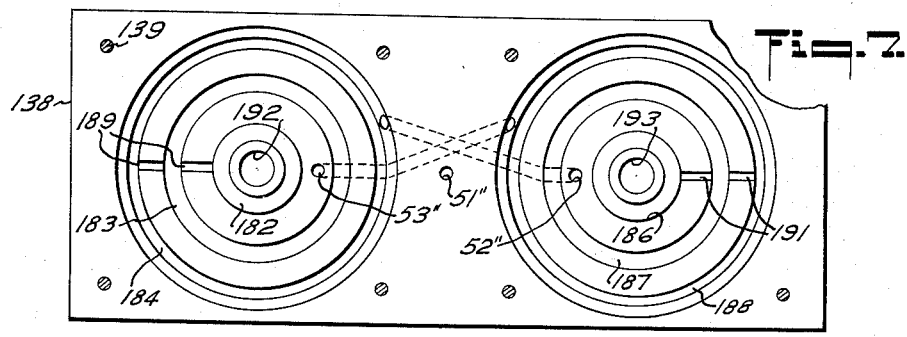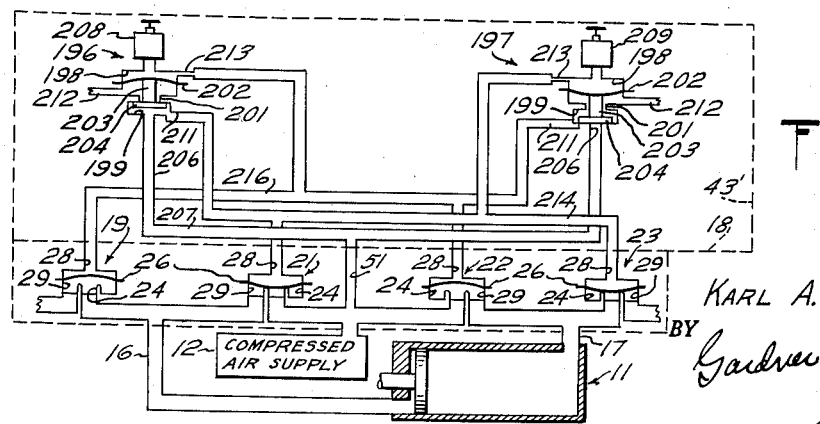

March 12, 1963 K. A. BRANDENBERG 3,080,887
FLUID PRESSURE-OPERATED MULTI-WAY VALVE
Filed March 6, 1961 3 Sheets-Sheet 3

INVENTOR.
KARL A. BRANDENBERG
BY
Gardner + Zimmerman
ATTORNEYS

United States Patent Office 3,080,887
Patented Mar. 12, 1963

3,080,887
FLUID PRESSURE-OPERATED MULTI-WAY VALVE
Karl A. Brandenberg, San Leandro, Calif., assignor, by mesne assignments, to Modernair Corporation, Bryan, Ohio, a corporation of Ohio
Filed Mar. 6, 1961, Ser. No. 93,506
13 Claims. (Cl. 137—622)

The present invention relates to multi-way valves and more particularly to a substantially friction-free valve wherein a plurality of inter-related valving elements are operated solely by fluid pressure and without connection by movable mechanical mechanism of any form.

Control devices for performing a plurality of co-ordinated valving functions are widely used in hydraulic and pneumatic systems. To control a pneumatic drive cylinder, for example, a four-way valve is generally used. The cylinder control valve must direct compressed air from an inlet to a selected end of the drive cylinder while simultaneously venting the opposite end. In this usage, as in others, it is desirable that the valve be reliable, compact, economical to manufacture and that it be operable at low air supply pressures.

The foregoing desirable properties are not fully realized in the valves heretofore used for cylinder control owing to the fact that conventional valves require some form of internal movable mechanical linkage to co-ordinate the several valving functions. For example many such valves use a sliding seal, carrying spool to simultaneously switch several pneumatic connections. Aside from the general friction, wear and complication resulting from the movable mechanism such as the spool, such valves exhibit a tendency to stick and may fail to completely seal and open valve ports. Inasmuch as the valve mechanism is generally operated by the air supply pressure, the valves become particularly unreliable when used in low pressure systems.

The present invention is a novel multi-way valve structure overcoming the above discussed disadvantages of prior equipment. The invention provides a pneumatic circuit which with several valving functions may be operated and co-ordinated without connection by mechanical mechanism, interconnection between the functions being made solely by pneumatic channels. Owing to the absence of internal mechanical linkage, friction is substantially eliminated, reliability is maximized and the valve is operable with much lower supply pressures than have heretofore been practical.

A further and important result is that the valve may be made compact and may be formed of a small number of rigidly fastened parts thereby forming a rugged, readily manufactured unit.

A further advantageous property of the novel circuit is that a valve embodying the circuit is bistable, i.e. all valving elements are continually held at the selected one of their two positions by fluid pressure. Thus stalling of the valve elements at intermediate positions does not occur.

It is accordingly an object of this invention to provide a multi-way valve for fluid systems in which a plurality of valving elements are operated and co-ordinated solely by fluid pressure.

It is another object of the invention to provide a substantially friction-free multi-way valve requiring no internal movable mechanical mechanism for co-ordinating the several valving functions thereof.

It is another object of this invention to provide a four-way valve suitable for controlling fluid pressure driven cylinders which is highly reliable and in which valving members are held at their selected positions by a constantly acting fluid pressure whereby stalling of the valving members at intemediate positions is prevented.

It is another object of the invention to provide a pneumatic circuit for a four-way valve which may be embodied in a compact unit, comprised of a small number of rigidly fastened parts, and which may be economically manufactured.

It is still another object of this invention to provide a four-way pneumatic valve of the class operated by air supply pressure which will operate with high reliability at much lower supply pressures than have heretofore been customary.

It is a further object of the invention to provide a multi-way valve having a plurality of valve seats and associated valving elements in which each of the valving elements may be held against its seat by direct fluid pressure and the valve is thereby completely self-sealing.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawings and descirption may be adopted within the scope of the invention as set forth in the claims.

FIGURE 5 is a longitudinal section view of a second embodiment of the invention which is also a four-way valve utilizing the pneumatic circuit of FIGURE 1 and suitable for controlling an air driven power cylinder.

FIGURE 6 is a section view taken along line 6—6 of FIGURE 5.

FIGURE 7 is a section view taken along line 7—7 of FIGURE 5.

FIGURE 8 is a schematic circuit diagram showing a modified form of the invention which is also suitable for a four-way air cylinder control valve.

Figure 1:
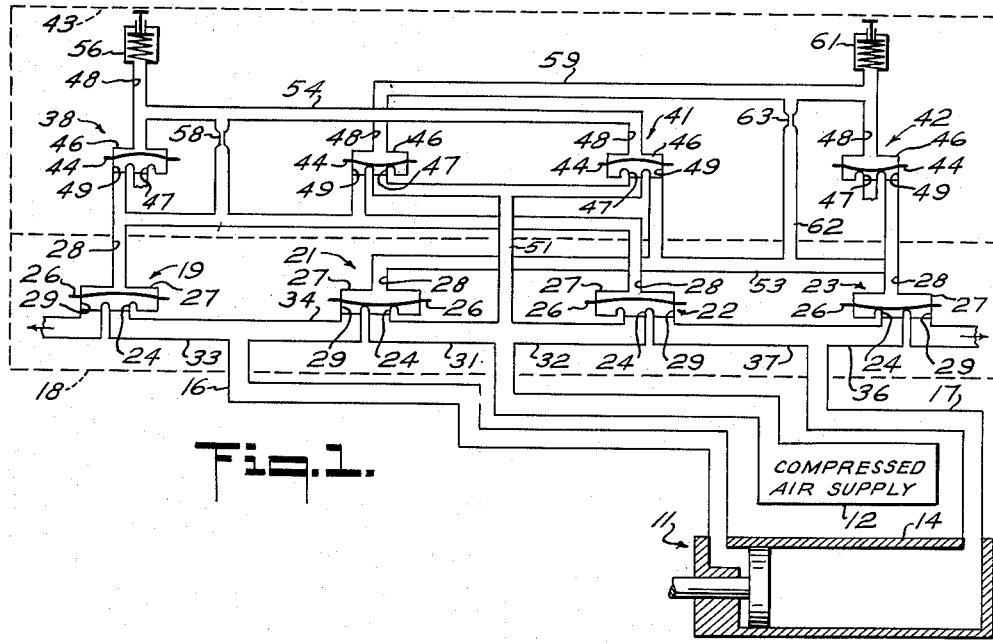
FIGURE 1 is a pneumatic circuit diagram, shown in schematic form, of a four-way valve for controlling a compressed air driven power cylinder.

Referring now to the drawing and more particularly to FIGURE 1 thereof, there is shown a pneumatic circuit with which four separate valve ports are opened or sealed, without intervening mechanical linkage, to effect a four-way action. The circuit is shown as used for controlling a pneumatic drive cylinder and for purposes of reference the cylinder 11 and a compressed air supply 12 are shown. Cylinder 11 may be of conventional design and thus comprises a piston 13 sliding longitudinally within a cylindrical barrel 14, a first air conduit 16 being communicated with the forward end of the barrel and a second conduit 17 being communicated with the opposite end thereof.

To operate the cylinder 11, four valving functions must be performed, i.e. air from supply 12 must be admitted to conduit 16 and conduit 17 must be opened to exhaust for operation of the cylinder in a first direction and air must be admitted to conduit 17 and conduit 16 opened for exhaust for operation in the opposite direction. Thus the valving section of the control unit, which section is shown enclosed by dashed line 18, must have four valve units 19, 21, 22 and 23 respectively each having a valve seat 24 and associated valving element 26.

As will hereinafter be discussed in greater detail the objectives of the invention are best realized by using flexible diaphragms for the valving elements 26, which diaphragms are each mounted transversely within a housing 27 in position to bear against the valve seats 24 when high pressure air is admitted to the housing through a pilot port 28 situated on the opposite side of the diaphragm from the seat 24. Each of the housings 27 is also provided with a third port 29 situated on the same side of the diaphragm 26 as the port formed by the valve seat 24.

While it is preferred to use diaphragms for the valving units, it should be understood that other forms of air actuated valve structure may be employed with the novel pneumatic circuit. For example, the diaphragms 26 may be replaced with rigid pistons slidably and sealingly disposed within the housings 27.

To provide for the control of cylinder 11, valve seat ports 24 of valve units 21 and 22 are communicated with air supply 12 by conduits 31 and 32 respectively. Valve seat port 24 of valve unit 19 and third port 29 of valve unit 21 are each communicated with cylinder conduit 16 through conduits 33 and 34 respectively. Similarly, valve seat conduit 24 of valve unit 23 and third port 29 of valve unit 22 are each communicated with cylinder conduit 17 through conduits 36 and 37 respectively. Third ports 29 of valve units 19 and 23 each open to atmosphere to form exhausts.

Thus if the diaphragms 26 of valve units 19 and 22 are lifted from their seats 24 while the diaphragms of valve units 21 and 23 are held against their seats, air from supply 12 will be admitted to the rearward end of drive cylinder 11 and the forward end of the cylinder will be vented. Accordingly, the cylinder 11 will undergo an extension stroke. If the position of the diaphragm 26 in each valve unit 19, 21, 22 and 23 is reversed, the cylinder 11 will undergo a contraction stroke.

Considering now means for pneumatically controlling the diaphragms 26 of the valve units 19, 21, 22 and 23 to effect the operating cycle described above, a set of four pilot valve units 38, 39, 41 and 42 are provided the pilot section of the circuit being shown enclosed by dashed line 43. Each of the pilot valve units is essentially similar to the valve units of the valving section 18 and thus includes a flexible diaphragm 44 mounted transversely in a housing 46. Each housing 46 is provided with a valve seat port 47 on one side of diaphragm 44, a second port 48 on the opposite side thereof and a third port 49 on the valve seat side of the diaphragm.

Valve seat ports 47 of pilot units 39 and 41 are each communicated with air supply 12 through a conduit 51. Third ports 49 of pilot units 38 and 39 are each communicated with pilot ports 28 of valve units 19 and 22 through a conduit 52. Similarly, third ports 49 of pilot units 41 and 42 are each communicated with pilot ports 28 of valve units 21 and 23 through a conduit 53. Valve seat ports 47 of pilot units 38 and 42 open to atmosphere.

Second ports 48 of pilot units 38 and 41 are intercommunicated by a conduit 54 which connects with a first normally closed bleed valve 56. A conduit 57 connects conduits 52 and 54 through a restricted orifice 58 which is of less diameter than the vent passage formed by first bleed valve 56. Similarly, second ports 48 of pilot units 39 and 42 are intercommunicated by a conduit 59 which connects with a second normally closed bleed valve 61 and a conduit 62 connects conduits 59 and 53 through a similarly restricted orifice 63.

Considering now how the above described elements of the pilot section 43 act to control the valve units of valving section 18, it will be assumed that the circuit is initially in the positions shown in FIGURE 1, i.e. the diaphragms 44 of pilot units 39 and 42 are seated against the valve seats 47 thereof while the diaphragms of pilot units 38 and 41 are distended from the valve seats thereof. Inasmuch as pilot unit 41 is thus open, high pressure air from supply 12 is admitted to the pilot ports 28 of valve units 21 and 23 thereby seating the diaphragms 26 thereof against the associated valve seats 24. Since pilot unit 39 is closed, no high pressure is present at the pilot ports 28 of valve units 19 and 22 and the diaphragms 26 thereof are consequently retracted from their associated valve seats 24 by the air pressure at the valve seats.

Thus valve units 19 and 22 are open while valve units 21 and 23 are closed. As hereinbefore described, these are the conditions at which high pressure is admitted to the rearward end of cylinder 11 while the forward end thereof is vented and the cylinder thus undergoes an extension stroke.

To reverse cylinder 11 and initiate a contraction stroke thereof, second bleed valve 61 is momentarily opened. This action vents pilot units 39 and 42 through the second ports 48 thereof causing the diaphragms 44 of the units to be lifted from their valve seats 47 by the high pressure thereat. It should be noted that the foregoing venting of pilot units 39 and 42 may be effected in spite of the connection with the air supply 12 through conduit 62 owing to the restriction 63 in the latter. Air may be exhausted through bleed valve 61 more rapidly than it can be replenished through the restriction 63.

Upon the opening of pilot unit 39 as described above, high pressure from supply 12 is admitted to the pilot ports 28 of valve units 19 and 22 while the concurrent opening of pilot unit 42 vents valve units 21 and 23 through the pilot ports thereof. The diaphragms 26 of all valve units 19, 21, 22 and 23 are thus caused to reverse their positions and assume the settings hereinbefore described as those at which cylinder 11 undergoes a contraction stroke.

As a final step in the operation, sufficient air from supply 12 passes through restriction 58 to raise the pressure within conduit 54, and diaphragms 44 of pilot units 38 and 41 are forced against their valve seats 47. All valve units 19, 21, 22 and 23 and pilot units 38, 39, 41 and 42 are now reversed from their initial positions and the motion of the drive cylinder 11 has been reversed.

The later momentary opening of first bleed valve 56 will initate an opposite sequence of diaphragm reversals whereby the circuit is returned to the initial condition and the motion of the drive cylinder 11 is again reversed.

As herein described, the circuit is controlled by the pilot bleeder principle; i.e. when the cylinder 11 is to be reversed, a button on one of the bleed valves 56 or 61 is depressed to vent a portion of the circuit momentarily. The circuit may be adapted however for control by other pneumatic techniques. Control by remote pilot pressure source may be had, for example, by removing the bleed valves 56 and 61 and selectively applying high pressure to the second port 48 of pilot unit 38 and alternately to the second port 48 of pilot unit 42. Electrical control of the circuit may be effected by replacing the bleed valves 56 and 61 with normally closed solenoid valves. Thus the invention is readily adaptable to control by various methods.

Figure 2:
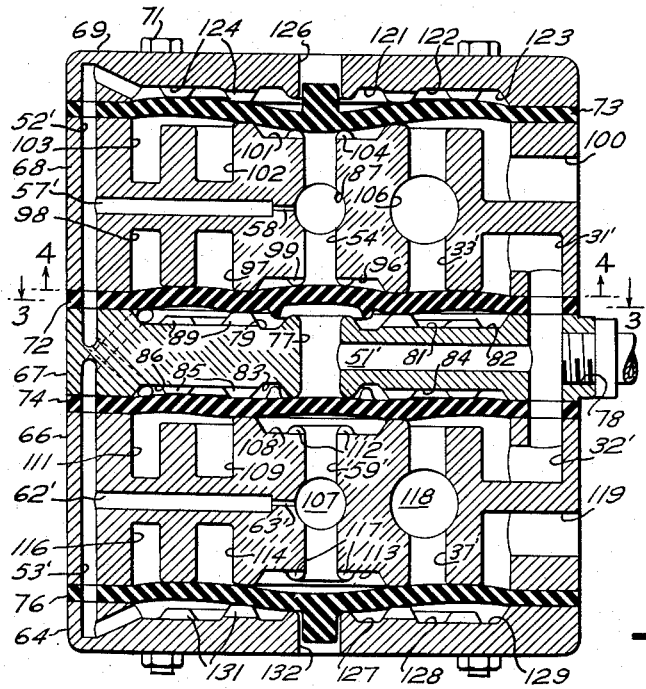
FIGURE 2 is a longitudinal sectional view of a first four-way valve embodying the circuit of FIGURE 1.
Figure 3:
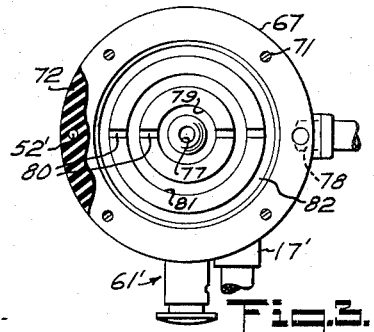
FIGURE 3 is a cross section view of the valve of FIGURE 2 taken along line 3—3 thereof.
Figure 4:
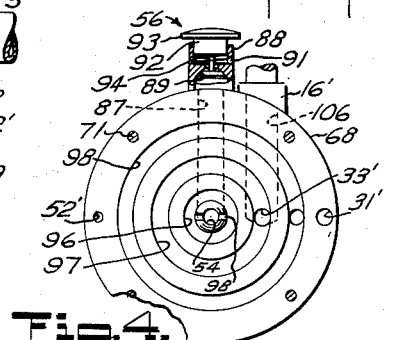
FIGURE 4 is an additional cross section view of the valve of FIGURE 2 taken along line 4—4 thereof.

A particular advantage of the valve circuit is that it may be formed into an extremely compact unit with a very small number of parts, all of which are rigidly secured together. Referring now to FIGURES 2, 3 and 4 in conjunction, a first detailed embodiment of the circuit is shown which contains all elements of the circuit of FIGURE 1 and is similarly adapted for controlling a pneumatic drive cylinder. To clarify such relationship, certain of the elements of this embodiment will be identified by prime numbers corresponding to those of FIGURE 1 and to avoid unnecessary duplication, the drive cylinder and air supply are not shown in FIGURES 2, 3 and 4.

The valve is comprised of five circular housing members 64, 66, 67, 68 and 69 which are of like diameter and which are secured together in stacked coaxial relationship by longitudinal tie-bolts 71. A circular elastic diaphragm, formed of sheet rubber, for example, is disposed between each adjoining pair of housing members, a first diaphragm 72 being between the center housing member 67 and a first of the intermediate housing members 68, a second diaphragm 73 being between intermediate member 68 and a first of the end housing members 69, a third diaphragm 74 being between center member 67 and the second intermediate member 66 and a fourth diaphragm 76 being between intermediate member 66 and the second of the end housing members 64. Each of the diaphragms 72, 73, 74 and 76 are equal in diameter with the housing members.

Referring now to FIGURES 2 and 3 in particular, the housing center member 67 is transpierced by an axial passage 77 and a connecting passage 51′ extends radially therefrom to a compressed air inlet 78 in the lateral wall of the member. The face of center member 67 which is adjacent diaphragm 72 is provided with three concentric annular grooves 79, 81 and 82 of progressively increasing diameter, the three grooves being intercommunicated by radially aligned notches 80 crossing the intervening raised portions of the center member. Three identical concentric grooves 83, 84 and 86, of progressively increasing diameter, are provided on the opposite face of center member 67 and are intercommunicated by notches 85 thereon.

Referring now to FIGURES 2 and 4 in particular, the first intermediate housing member 68 is also transpierced by an axial passage 54′. A radially aligned passage 87 within member 68 connects passage 54′ with the first normally closed bleed valve 56′ which is mounted on the lateral surface of the member. Bleed valve 56′ may typically be comprised of a cylindrical casing 88 having an annular valve seat 89 formed therein and with a vent aperture 91 in the casing wall outwardly from the valve seat. A sliding axial plunger 92 has a first end forming a valve member for seating against valve seat 89, an intermediate shank portion of reduced diameter and an outer end portion which projects axially from casing 88 and is provided with a button 93 which may be manually depressed to open the bleed valve. A compression spring 94 is disposed within casing 88 to hold the bleed valve 56′ in its normally closed position.

The surface of intermediate housing member 68 adjacent to diaphragm 72 is provided with three concentric grooves 96, 97 and 98 respectively corresponding in diameters to grooves 79, 81 and 82 of center member 67. The smallest of the grooves 96 is communicated with axial passage 54′ by a pair of radially directed notches 99 in the intervening raised portion of the member. The opposite face of member 68 is provided with an identical set of three concentric grooves 101, 102 and 103, the first and smallest of which is communicated with axial passage 54′ by notches 104.

Grooves 97 and 102 of housing member 68 are connected by a longitudinal passage 33′ and a chordal passage 106 connects passage 33′ with a first outlet fitting 16′ at the lateral wall of the member. Outlet 16′ may, for example, connect with one end of a drive cylinder as described in conjunction with FIGURE 1. Groove 103 is vented to the atmosphere through a short passage 100 and an angled passage 31′ connects groove 98 with air inlet passage 51′ in center member 67, the passage 31′ extending through diaphragm 72.

The second intermediate housing member 66 is similar to the first intermediate member 68 as described above and thus is provided with an axial passage 59′ and a radial passage 107 connecting therewith, a second normally closed bleed valve 61′ being mounted in the wall of the member at the outer end of passage 107 as shown in FIGURE 3. Referring again to FIGURE 2, the face of member 66 adjacent diaphragm 74 is provided with three concentric annular grooves 108, 109 and 111 corresponding in diameter to grooves 83, 84 and 86 respectively of center member 67. The innermost groove 108 is communicated with axial passage 59′ by notches 112. A similar set of three concentric annular grooves 113, 114 and 116 are provided on the opposite face of intermediate member 66, the grooves being of progressively increasing diameter and the innermost groove being connected with axial passage 59′ by notches 117.

Grooves 109 and 114 of intermediate member 66 are connected by a longitudinal passage 37′. A further passage 118 connects passage 37′ with a second outlet fitting 17′ (see FIGURE 3) in the lateral wall of member 66 which fitting may connect with the second end of a drive cylinder. A short passage 119 vents groove 116 to atmosphere and an angled passage 32′ connects groove 111 with the air inlet passage 51′ in center member 67, the passage 32′ extending through diaphragm 74.

The end housing member 69 is provided with three concentric annular grooves 121, 122 and 123 on the face adjacent diaphragm 73 the grooves respectively corresponding in diameter to grooves 101, 102 and 103 of intermediate member 68. Connections between the grooves of end member 69 are similar to those of the center member 67 and thus all three are interconnected by notches 124. An axial exhaust passage 126 transpierces end member 69 at the center thereof.

The opposite end housing member 64 is similar to member 69 as described above and thus is provided with three concentric annular grooves 127, 128 and 129 on the face adjacent diaphragm 76 which grooves have diameters respectively corresponding to those of grooves 113, 114 and 116 of intermediate member 66. All of the grooves 127, 128 and 129 are interconnected by notches 131 and an axial exhaust passage 132 transpierces member 64 at the center thereof.

An angled passage 52′ connects groove 123 of end member 69 with groove 86 of center member 67, such passage transpiercing the intervening housing member 68 and diaphragms 72 and 73. Within member 68, such passage 52′ is connected with the axial passage 54′ by a further passage 57′. Passage 57′ is formed with a restriction 58′ which, as hereinbefore discussed, is of less diameter than the vent aperture of first bleed valve 56′.

A similar angled passage 53′ communicates groove 129 of second end member 64 with groove 82 of center member 67 and passes through the intervening housing member 66 and diaphragms 74 and 76. Within member 66, passage 53′ is connected with the axial passage 59′ by a radial passage 62′. Passage 62′ contains a restriction 63′ similar to that described above.

The four-way valve of FIGURES 2, 3 and 4 operates as described in conjunction with the schematic circuit of FIGURE 1. The center portions of diaphragms 72 and 73 function as valve units corresponding to the pilot units 41 and 38 respectively of FIGURE 1. The center portions of diaphragms 74 and 76 function as the pilot units 39 and 42 respectively of FIGURE 1. The annular band on diaphragm 73 which spans grooves 102 and 103 of member 68 functions as valve unit 19 of FIGURE 1 and the corresponding band of diaphragm 72 functions as the valve unit 21 thereof. The corresponding band on diaphragm 74 functions as the valve unit 22 of FIGURE 1 and the corresponding band of diaphragm 76 functions as valve unit 23 thereof.

Thus following a momentary opening of first bleed valve 56′, the diaphragms will assume the positions shown in FIGURES 2, 3 and 4. At this position, high pressure air from inlet 78 is transmitted to the second outlet 17′ while first outlet 16′ is vented through exhaust passage 100. Upon the subsequent momentary opening of second bleed valve 61′, the sequence of diaphragm reversals hereinbefore described occurs and first outlet 16′ is sealed while second outlet 17′ is communicated with the air inlet 78.

Essentially the same four-way valve may be constructed as a unit of widely different proportions and with an even smaller number of parts. Referring now to FIGURES 5, 6 and 7 in conjunction, a second embodiment of the invention is shown, the second embodiment having but four parts exclusive of tie bolts, plugs and bleed valves.

This embodiment is formed by a flat rectangular housing center member 133 having diaphragms 134 and 136, of similar configuration, disposed one against each major surface thereof. A first rectangular housing end member 137 is disposed against diaphragm 134 and a second similar end member 138 is disposed against diaphragm 136, the members being secured together by through-bolts 139.

The face of center member 133 adjacent diaphragm 134 is provided with a first set of concentric annular grooves 141, 142 and 143 of progressively increasing diameters, the grooves being displaced from the center of the face and contained on less than one half of the total area thereof. The foregoing grooves 141, 142 and 143 are concentric with a passage 59″ which transpierces center member 133 and the annular portions of member 133 which separate groove 141 from passage 59″ and which separate grooves 142 and 143 are slightly recessed with respect to the face of the member.

An identical set of three concentric annular grooves 146, 147 and 148 are formed on the opposite face of center member 133 which grooves are also centered on passage 59″ and which are similarly of progressively increased diameter.

A passage 37″ transpierces member 133 and connects grooves 142 and 147. A passage 149 connects passage 37″ with an outlet fitting 17″ mounted at the lateral wall of member 133. A parallel passage 151 within member 133 connects passage 59″ with a normally closed bleed valve 61″ also mounted at a lateral wall of the member. Passage 59″ is also communicated with grooves 141 and 146 by means of notches 152 across the intervening annular portions of the center member 133. Additional pneumatic connections include an angled passage 153 within member 133 which vents groove 143 at atmosphere and a passage 32″ connecting groove 148 with an air inlet passage 154. Passage 154 communicates with a high pressure air supply fitting 156 mounted at a lateral face of member 133.

A similar arrangement of grooves and passages is provided on the remaining half of center member 133. Thus the member 133 is transpierced by a passage 54″ and three annular grooves 157, 158 and 159, concentric with passage 54″ and of progressively increased diameter, are formed on the face of the member adjacent diaphragm 134. An identical set of grooves 161, 162 and 163 are formed on the opposite face of member 133. The member is transpierced by a passage 33″ which connects grooves 158 and 162 and which connects with a perpendicular passage 164 leading to an outlet fitting 16″ at the lateral wall of member 133. A passage 166 communicates passage 54″ with a normally closed bleed valve 56″ also mounted at a lateral wall of the member 133. Additional connections within member 133 include a passage 167 venting groove 159 and a passage 31″ connecting groove 163 with the air inlet passage 154. Communication between passage 54″ and grooves 157 and 161 is provided by notches 168 across the intervening annular portions of the center member 133.

Each of the housing end members 137 and 138 is formed with two sets of three concentric annular grooves conforming in diameters and placement to those on the adjacent faces of center member 133. Thus first end member 137 has a first set of grooves 169, 171 and 172 matching center member grooves 141, 142 and 143 respectively and a second set of grooves 173, 174 and 176 matching center member grooves 157, 158 and 159 respectively. The annular portions of end member 137 which separate groove 171 from groove 172 and groove 174 from groove 176 are slightly recessed with respect to the general surface of the member. Grooves 169, 171 and 172 are interconnected by notches 177 and grooves 173, 174 and 176 are connected by notches 178.

The end member 137 is transpierced by a passage 179 concentric with groove 169 and by a second passage 181 which is concentric with groove 173.

Similarly, the second housing end member 138 is provided with a first set of three annular grooves 182, 183 and 184 corresponding in diameter and placement to grooves 146, 147 and 148 of center member 133 and with a second set of three annular grooves 186, 187 and 188 corresponding in diameter and placement to grooves 161, 162 and 163 respectively of the center member. Grooves 182, 183 and 184 are interconnected by notches 189 and grooves 186, 187 and 188 are connected by notches 191.

A bore 192 within end member 138 extends along the centerline of groove 182 from the side of member 138 adjacent diaphragm 136 to a point short of the opposite side thereof and a second and similar bore 193 extends along the center line of groove 186. A passage 194 connects bores 192 and 193 and is in turn connected with the air supply by a passage 51″ which extends through diaphragm 136 and into center member 133 to connect with passage 154 thereof.

A passage 53″ passes through diaphragms 134 and 136 as well as center member 133 to connect groove 188 of end member 138 with groove 171 of end member 137. A similar passage 52″ connects groove 184 of end member 138 with groove 174 of end member 137. Within center member 133, a restricted passage 63″ connects passage 53″ with passage 59″ and an additional restricted passage 58″ connects passage 52″ with passage 54″.

The valve of FIGURES 5, 6 and 7 is thus similar in its elements and pneumatic connections to the valve of FIGURES 2, 3 and 4 as well as to the schematic circuit of FIGURE 1 and accordingly operates in a similar manner. With high pressure air supplied to fitting 156, such air is transmitted to outlet 17″ while the valve is in the position shown in FIGURE 5, the other outlet 16″ being vented. Upon the momentary opening of bleed valve 61″ outlet 16″ is communicated with air supply fitting 156 and outlet 17″ is vented. Subsequent opening of bleed valve 56″ restores the valve to the initial position.

Variations in the pneumatic circuit of FIGURE 1, and thus further variations in the detailed structure of the invention, may be made. Referring now to FIGURE 8, a four-way valve circuit having a modified pilot section is shown, the modification still providing for solely pneumatic control of the primary valving functions.

In FIGURE 8, the valving section 18 of the circuit is identical with that hereinbefore described with reference to FIGURE 1 and thus includes the valve units 19, 21, 22 and 23 connected with drive cylinder 11 and air supply 12 as previously discussed.

Considering now the modified pilot section 43′ of the circuit, a pair of pilot units 196 and 197 are provided, each such unit having a housing with a first chamber 198 and a second chamber 199, the chambers being coaxial and connected by a housing section 201 of reduced diameter. Each unit 196 and 197 is provided with a transverse diaphragm 202 secured within chamber 198 and dividing the chamber into two hermetically separate sections. Each of the diaphragms 202 is formed with a shank portion 203 which extends axially through housing section 201 and which is of expanded diameter at the end forming a valve disc 204.

A valve seat 206 is formed within each housing chamber 199 along the axis thereof and opposite from the housing section 201. Each of the valve seats 206 is connected with air supply conduit 51 of valving section 18 by a conduit 207. First bleed valve 208 is communicated with chamber 198 of pilot unit 196 on the opposite side thereof from section 201 and a second bleed valve 209 is similarly communicated with pilot unit 197.

Each of the pilot units is formed with a first port 211 in chamber 199, a second port 212 in chamber 199 which port is an open vent and is situated on the same side of diaphragm 202 as section 201, and a third port 213 in chamber 199 on the opposite side of the diaphragm. Third ports 213 form a narrow flow restriction and are therefore of substantially less diameter than the flow passages through bleed valves 208 and 209.

To couple the pilot section of the circuit with the valving section thereof, a conduit 214 connects first port 211 of pilot unit 196 and third port 213 of pilot unit 197 with the pilot ports 28 of valve units 21 and 23. Similarly a conduit 216 connects first port 211 of pilot unit 197 and a third port 213 of pilot unit 196 with valve units 19 and 22.

In operation, the opening of first bleed valve 208 will establish the circuit in the position shown in FIGURE 8. At this position, diaphragms 26 of valve units 19 and 22 are lifted from the associated valve seats 24 while the diaphragms of valve units 21 and 23 are pneumatically held against the associated valve seats. Accordingly, compressed air from supply 12 is transmitted to drive cylinder port 17 while the opposite cylinder port 16 is vented.

Also at this position of the circuit, air from supply 12 is communicated with chamber 199 of pilot unit 196 thereby holding disc 204 in sealing position against section 201 thereof. From chamber 199 of unit 196, high pressure is transmitted to the pilot ports 28 of valving units 21 and 23 to hold the diaphragms 26 thereof in the above described position. High pressure within the chamber 199 of unit 196 is also transmitted to chamber 198 of pilot unit 197 through the restricted port 213 thereof thereby acting on diaphragm 202 of unit 197 and causing disc 204 to seal the adjacent valve seat port 206. The closing of the port 206 in this manner prevents the high pressure from acting on the pilot sides of valving units 19 and 28.

To reverse the valve position, and thus the movement of drive cylinder 11, bleed valve 209 is momentarily opened. Such action vents the adjacent portion of chamber 198 of pilot unit 197 thereby allowing the high pressure air at port 206 of unit 197 to lift the adjacent disc 204 and drive it into sealing abutment against section 201. High pressure air is thus admitted to conduit 216 from which it is transmitted to the pilot ports 28 of valving units 19 and 22. The diaphragms 26 of valving units 19 and 22 are thereby caused to assume a reverse curvature and seal the ports 24 of the units 19 and 22.

The foregoing admission of high pressure air to chamber 199 of pilot unit 197 delivers high pressure to chamber 198 of pilot unit 196 through the restricted port 213 thereof. Owing to the greater diameter of diaphragm 202 relative to the housing section 201, the diaphragm reverses curvature thereby venting the adjacent chamber 199 through port 212 and carrying the associated disc 204 into sealing position against port 206. The foregoing movement of disc 204 communicates the pilot ports 28 of valving units 21 and 23 with the exhaust port 212 of pilot unit 196 while disconnecting the units 21 and 23 from the air supply. Accordingly, the diaphragms 26 of valving units 21 and 23 are lifted by the pressure at ports 24 thereof and assume a reverse curvature.

With all diaphragms of the valving section and pilot section reversed from the initial position, air from supply 12 is transmitted to cylinder port 16 and the opposite cylinder port 17 is vented. The later momentary opening of bleed valve 208 will initiate an opposite sequence of diaphragm reversals and restore the circuit to the first position.

Figure 9:
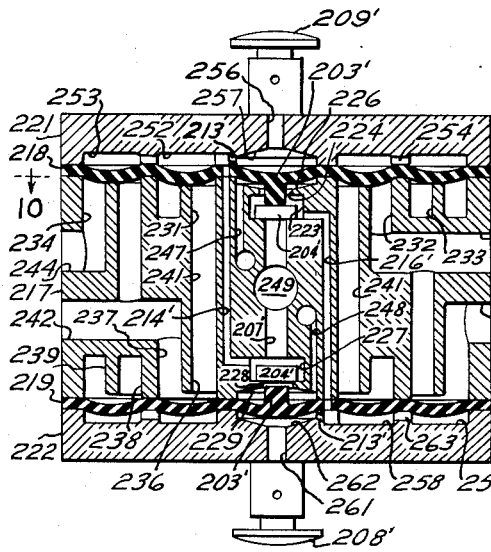
FIGURE 9 is a longitudinal section view of a four-way valve embodying the modified circuit of FIGURE 8.
Figure 10:
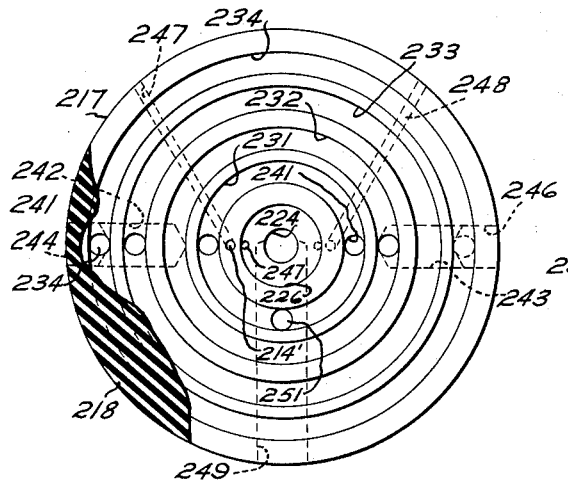
FIGURE 10 is a cross section view taken along line 10—10 of FIGURE 9.

Referring now to FIGURES 9 and 10 in conjunction, a four-way valve embodying the circuit of FIGURE 8 is shown. To avoid unnecessary complication, external fittings, air supply conduits, tie bolts and the like are not shown inasmuch as such elements may be generally similar to those of the valve embodiments hereinbefore described.

The valve is comprised of a circular center member 217 having a first circular diaphragm 218 of like diameter disposed against one end thereof and having a second similar diaphragm 219 disposed against the opposite end. A first circular end member 221 is disposed against diaphragm 218 and secured to the center member 217 in coaxial relationship thereon and a second circular end member 222 is secured coaxially to the opposite end of the center member against the second diaphragm 219.

Center member 217 is formed with an axial passage 207'. The end of passage 207' adjacent diaphragm 218 includes a section 223 of enlarged diameter followed by a section 224 of intermediate diameter and a final section 226 which flares outwardly to a diameter greater than that of section 223. The opposite end of passage 207' is similarly provided with a section 227 of enlarged diameter, a subsequent section 228 of intermediate diameter and an outwardly flaring final section 229 of greatest diameter.

The end of center member 217 adjacent diaphragm 218 has four grooves 231, 232, 233 and 234 concentric with passage 207' and of progressively increased diameter. Similarly the opposite end of center member 217 is provided with four corresponding grooves 236, 237, 238 and 239 of progressively increased diameter. The annular portions of center member 217 which separate groove 231 from groove 232, groove 233 from groove 234, groove 236 from groove 237 and groove 238 from groove 239 are slightly recessed from the general end surfaces of the center member.

A pair of longitudinal passages 241 connect groove 231 with groove 236. A radially directed outlet passage 242 branches within center member 217 to connect with both groove 233 and groove 237 and a second such outlet passage 243 connects with grooves 232 and 238. The radial passages 242 and 243 constitute the valve outlets and may be connected with the two ends of a drive cylinder for example.

Further pneumatic channels within center member 217 include an exhaust passage 244 venting groove 234 and an exhaust passage 246 venting groove 239. An additional exhaust passage 247 vents section 226 of passage 207' and an exhaust passage 248 vents section 229 thereof. A radially directed air inlet passage 249 connects with the axial passage 207' and with a longitudinal passage 251 leading to grooves 231 and 236.

Considering now the air channels within the first end member 221, two concentric grooves 252 and 253 are formed on the face of the member adjacent diaphragm 218. The inner groove 252 spans the two grooves 231 and 232 of center member 217 and the outer groove 253 spans the two grooves 233 and 234 thereof. Grooves 252 and 253 are connected through notches 254. End member 221 is transpierced by an axial passage 256 which is formed with a flared end section 257 conforming to section 226 of the center member 217. A first normally closed bleed valve 209' is mounted at the exterior surface of the end member at passage 256.

The second end member 222 is of similar construction and is thus formed with two concentric grooves 258 and 259 on the side adjacent diaphragm 219. Groove 258 spans center member grooves 236 and 237 and groove 259 spans grooves 238 and 239 thereof. End member 222 has an axial passage 261 with a flared inner extremity 262 conforming to center member section 229. Notches 263 connect grooves 258 and 259 and a second normally closed bleed valve 208' is mounted at the outer end of the axial passage 261.

A passage 214' extends from center member section 227 through diaphragm 218 to first end member groove 252 and to axial passage section 257 thereof through a flow restriction 213'. Similarly, a passage 216' extends from center member section 223 through diaphragm 219 to second end member groove 258 and to axial passage section 262 of the end member, the latter connection being through a flow restriction 213'.

To complete the pilot section of the valve, rubber discs 204' are disposed coaxially within sections 223 and 227 of center member axial passage 207', the discs being positioned coaxially within the passage and being movable therein. Axial projections 203' formed on diaphragms 218 and 219 project through passage sections 224 and 228 to bear against the discs 204 when the center portions of diaphragms 218 and 219 are flexed in the direction of the center member 217. The discs 204' thus close the adjacent portions of axial passage 207' when the diaphragms are flexed in the foregoing direction.

The valve of FIGURES 9 and 10 corresponds in all its elements to the schematic circuit of FIGURE 8 and operates in the manner described with reference to FIGURE 8. The annular portion of diaphragm 219 which spans center member grooves 238 and 239 functions as the valve unit 19 of FIGURE 8 and the portion of such diaphragm spanning grooves 236 and 237 functions as the valve unit 22 thereof. The annular portion of diaphragm 218 spanning center member grooves 233 and 234 functions as the valve unit 23 of FIGURE 8 and the portion of diaphragm 218 spanning grooves 231 and 232 functions as valve unit 21. As herein described, such units are interconnected by passages corresponding to those of FIGURE 8.

Thus at the valve position shown in FIGURES 9 and 10, high pressure inlet passage 249 is communicated with outlet passage 242 and the outlet passage 243 is vented. Upon the momentary opening of bleed valve 209', all portions of diaphragms 218 and 219 reverse their curvature thereby communicating outlet 243 with air inlet 249 and venting outlet 242. The subsequent opening of bleed valve 208' restores the valve to the initial position.

Figure 11:
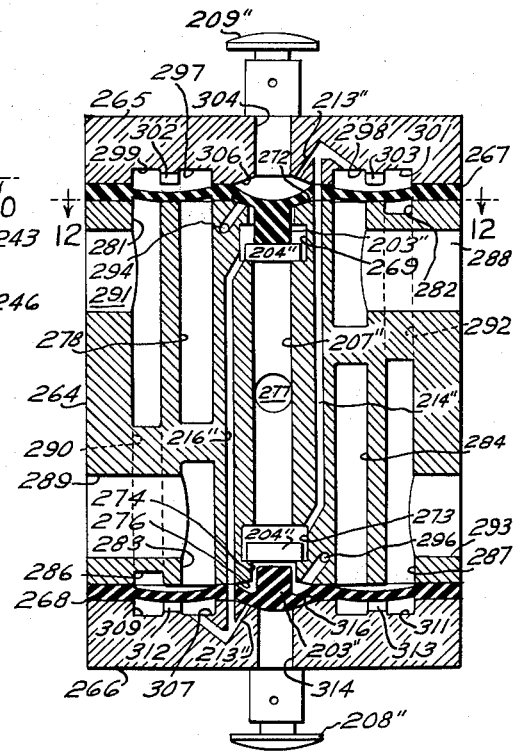
FIGURE 11 is a longitudinal section view of a second embodiment of the modified circuit of FIGURE 8.
Figure 12:
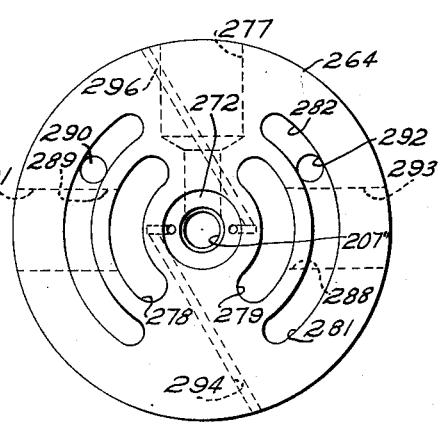
FIGURE 12 is a cross section view taken along line 12—12 of FIGURE 11.

Referring now to FIGURES 11 and 12, a second embodiment of the modified circuit of FIGURE 8 is shown in which angular sectors of each diaphragm are utilized to perform separate valving functions. The valve of FIGURES 11 and 12 is also of the four-way class and adapted for controlling a pneumatic cylinder, the cylinder and external valve fittings not being shown inasmuch as they may be similar to those hereinbefore described.

The valve is comprised of a cylindrical center member 264 having circular end members 265 and 266 secured coaxially to opposite ends thereof. A first circular diaphragm 267 is disposed between the center member 264 and end member 265 and a second such diaphragm 268 is disposed between the center member and end member 266.

An axial passage 207" extends through center member 264. At the end adjacent diaphragm 267, passage 207" has a section 269 of enlarged diameter followed by a section 271 of intermediate diameter and a terminal outwardly flared section 272. Similarly the opposite end of passage 207" is provided with an enlarged section 273, intermediate section 274 and terminal flared section 276. A radially directed high pressure air inlet passage 277 connects with passage 207".

As shown in FIGURE 12 in particular, four curved grooves 278, 279, 281 and 282 are formed on the end of center member 264 adjacent diaphragm 267. Grooves 278 and 279 are aligned along a circle concentric with passage 207" and are substantially confined to opposite sectors of the center member 264. Grooves 281 and 282 are aligned along a concentric circle of greater radius and are also confined to the same two opposed sectors of the end of center member 264, groove 281 being adjacent groove 278 and groove 282 being adjacent groove 279.

A similar set of four grooves 283, 284, 286 and 287 are formed on the opposite end of the center member 264 which grooves conform in configuration and placement to grooves 278, 279, 281 and 282 respectively. The groove 278 and the groove 284 on the opposite end of the member 264 are made sufficiently deep to extend more than one half of the axial length of member 264 and each such groove is extended slightly beyond the limits of the sector discussed above so that each such groove intersects and communicates with the high pressure air inlet passage 277.

Additional air channels within center member 264 include an angled passage 288 venting groove 279 and a similar passage 289 venting groove 283. A longitudinal passage 290 connects groove 281 with groove 286 and intersects a radially directed outlet passage 291. Similarly, a longitudinal passage 292 connects grooves 232 and 287 and intersects a radial outlet passage 293. An angled passage 294 vents the flared section 272 of axial passage 207" and a second such angled passage 296 vents the opposite flared section 276 thereof.

The first end member 265 is formed with four grooves 297, 298, 299 and 301 on the inner face which grooves correspond in configuration and placement to the center member grooves 278, 279, 281 and 282 respectively. Grooves 297 and 299 are communicated by a notch 302 and grooves 298 and 301 are communicated by a notch 303. End member 265 is transpierced by an axial passage 304 which has a flared inner end 306 conforming to flared section 272 of the center member 264 and a normally closed bleed valve 209" is mounted at the outer end of the passage 304.

The opposite end member 266 is of similar construction and is thus provided with four grooves 307, 308, 309 and 311 conforming in configuration and placement to center member grooves 283, 284, 286 and 287 respectively. Grooves 307 and 309 are connected by notch 312 and grooves 308 and 311 are connected by notch 313. The end member 266 is transpierced by an axial passage 314 having a flared inner section 316 and a normally closed bleed valve 208" is mounted at the outer end of passage 314.

A passage 216" extends within center member 264, diaphragm 268 and end member 266 to connect center member section 269 with end member groove 307 and with end member section 316 through a flow restriction 213". Similarly a passage 214" connects section 273 of the center member 264 with groove 298 of the end member 265 and further connects with section 306 thereof through a restriction 213".

Rubber discs 204" are disposed coaxially within sections 269 and 273 of the axial center member passage 207", the discs being movable therein. Axial projections 203" formed on diaphragms 267 and 268 project through passage sections 271 and 274 respectively to bear against the discs when the centers of the diaphragms are flexed in the direction of center member 264 thereby sealing the ends of passage 207" at such time. To provide for a valving action between the center member grooves 278 and 281, 279 and 282, 283 and 286, and 308 and 311, the portions of diaphragms 267 and 268 which span such grooves are made of reduced thickness relative to the remaining areas of the diaphragms, such construction being an alternate to recessing the portions of the housing which separate the grooves as in the previously described embodiments.

The valve of FIGURES 11 and 12 also corresponds in all its elements with the pneumatic circuit of FIGURE 8 and operates in the manner described with reference to FIGURE 8. The portion of diaphragm 268 spanning center member grooves 283 and 268 functions as the valving unit 19 of FIGURE 8, the portion of such diaphragm spanning grooves 284 and 287 functions as valving section 22 of FIGURE 8, the portion of diaphragm 267 spanning grooves 278 and 281 functions as valving unit 21 of FIGURE 8 and the portion of the latter diaphragm spanning grooves 279 and 282 functions as the valving unit 23. As herein described such elements are interconnected by passages essentially similar to those of FIGURE 8.

Thus at the valve position shown in FIGURES 11 and 12, high pressure air from inlet 277 is transmitted to outlet 293 while the other outlet 291 is vented. Upon the opening of bleed valve 209"', the diaphragms 267 and 268 are forced to assume reverse curvatures and outlet 291 is connected with the air inlet 277 while outlet 293 is vented. A subsequent opening of bleed valve 208″ restores the valve to the initial position.

It will be apparent to those skilled in the art that still other variations in the detailed structure of the invention may be made and that the mode of valve construction herein employed, specifically the interleaving of a series of housing members with flexible diaphragms in a stacked relationship, may be utilized for valves other than the four-way pneumatic cylinder control valves herein described.

What is claimed is:

1. In a multi-way valve having a high pressure fluid inlet passage and having a plurality of outlet passages, the combination comprising a plurality of primary valving units each having a first port communicated with said inlet passage and a second port communicated with a separate one of said outlet passages and having a valving member positioned to stop communication between said first and second ports upon the admission of high pressure fluid to a third port, and a pilot valving means having a first passage connecting with said fluid inlet passage and a plurality of second passages each communicating with said third port of a separate one of said primary valving units and having a fluid exhaust passage, said pilot valving means having a plurality of positions each connecting a separate one of said second passages with said first passage and connecting a different one of said second passages with said exhaust passage, said pilot valve means having a third passage adapted for selective communication with said inlet passage for operation of said valve means in response to said high pressure fluid.

2. In a multi-way valve having a high pressure fluid inlet and having a plurality of fluid outlets, the combination comprising at least two primary valve units each having a first port connected with said high pressure inlet and a second port connected with a separate one of said outlets, each of said primary valve units having a valving member positioned to interrupt communication between said first and second ports thereof upon the admission of high pressure to a third port, at least two pilot valve units each having a first port connected with said high pressure inlet and a second port connected with the third port of a separate one of said primary valve units, each of said pilot valve units having a third port, each of said pilot valve units further having a valving member positioned to interrupt communication between said first and second ports thereof upon the admission of high pressure to said third port thereof, and control means for selectively varying the pressure at said third ports of each of said pilot valve units.

3. A multi-way valve as described in claim 2 wherein said control means for selectively varying the pressure at said third ports of each of said pilot valve units comprises a first normally closed bleed valve communicated with said third port of a first of said pilot valve units and having an open position venting said third port of said first of said pilot valve units, means forming a fluid passage communicating said third port of said first pilot valve unit with said high pressure inlet and having a flow constriction therein, a second normally closed bleed valve communicated with said third port of a second of said pilot valve units and having an open position venting said third port thereof, and means forming a fluid passage communicating said third port of said second pilot valve unit with said high pressure inlet and having a flow constriction therein.

4. A four-way valve for connecting a high pressure fluid source with a selected one of a pair of outlets while concurrently venting the other of said outlets, comprising, in combination, four primary valve units each having a means defining a valve chamber with a first and a second and a third port therein, each of said primary valve units having a valving member therein positioned to block connection between said first and second ports thereof upon the admission of high pressure to said third port thereof, means connecting said first ports of a first and a second of said primary valve units with said fluid source, means connecting said first port of a third of said primary valve units with a first of said pair of outlets and connecting said second port of said first of said primary valve units therewith, means connecting said first port of a fourth of said primary valve units with the second of said pair of outlets and connecting said second port of said second of said primary valve units therewith, means forming an exhaust passage connecting with said second port of said third of said primary valve units and forming an exhaust passage connecting with said second port of said fourth of said primary valve units, and a pilot valving system having a first passage connecting with said third ports of said first and fourth valve units and having a second passage connecting with said third ports of said second and third valve units, said pilot system further having a third passage communicating with said fluid source and having exhaust outlet means and having two position valving elements with a first position at which said first passage is connected with said third passage and said second passage is connected with said exhaust means and with a second position at which said second passage is communicated with said third passage and said first passage is communicated with said exhaust means, said pilot system having means defining pilot actuating passages selectively communicating with said fluid source for exerting high pressure on said valving elements for control thereof.

5. A four-way valve as described in claim 4 wherein said valving member of each of said primary valve units comprises a flexible diaphragm extending across said valve chamber of said unit and separating said chamber into two hermetically isolated sections, said first and second ports of said primary valve unit being on a first side of said diaphragm and said third port thereof being on the opposite side of said diaphragm.

6. A four-way valve as described in claim 4 wherein said pilot system comprises four pilot valve units each having means defining a valve chamber with a first and second port therein and with a valving member therein positioned to block communication between said first and second ports upon the admission of high pressure fluid to a third port, a first and second of said pilot units having said first ports thereof communicated with said third passage, said first passage being connected with said second port of said second pilot unit and said second port of a third of said pilot units and said second passage being connected with said second port of said first pilot unit and said second port of a fourth of said pilot units and said exhaust means being connected with said first ports of said third and fourth pilot units, means forming a constricted passage connecting said third port of said third pilot unit with said first passage, means forming a constricted passage connecting said third port of said fourth pilot unit with said second passage, a first normally closed bleed valve communicated with said third port of said third pilot unit, and a second normally closed bleed valve communicated with said third port of said fourth pilot unit.

7. A four-way valve as described in claim 4 wherein said pilot system comprises means defining a first and a second valve chamber each having first and second sections connected by an intermediate section of less diameter, each of said first sections of said valve chambers having a first port opposite said intermediate sections and a second port spaced apart from said first port, said second sections of each of said valve chambers having a third port opposite from said intermediate sections and having an exhaust port adjacent said intermediate sections, means communicating said third passage with said first ports of said first and second valve chambers, means communicating said first passage with said second port of said first valve chamber, means communicating said second passage with said second port of said second valve chamber, means forming a constricted flow channel from said first passage to said third port of said first valve chamber, means forming a constricted flow channel from said second passage to said third port of said second valve chamber, a first valving element disposed in said first section of said first valve chamber for movement between two positions therein at one of which said first port thereof is blocked at the other of which said intermediate section thereof is blocked, a second valving element similarly disposed within said first section of said second valve chamber, a first flexible diaphragm extending across said second section of said first valve chamber between said third port and said exhaust port thereof and having a projecting portion extending through said intermediate section of said valve chamber to bear against said first valving element, a second flexible diaphragm similarly disposed within said second section of said second valve chamber and having a projecting portion extending through intermediate section of said second valve chamber to bear against said second valving element, a first normally closed bleed valve communicated with said third port of said first valve chamber, and a second normally closed bleed valve communicated with said third port of said second valve chamber.

8. A four-way fluid pressure operated valve comprising, in combination, a housing formed by a first flat end member, a first flat intermediate member, a flat center member, a second flat intermediate member and a second flat end member, said members being secured together in stacked relationship and being each transpierced by a first passage, each of the facing surfaces of said housing members having three annular grooves formed therein which are concentric with said first passage and of progressively increased diameter, said three grooves being intercommunicated on each face of said center member and being intercommunicated on the inner faces of said end members, the inner one of said grooves on each face of each of said intermediate members being communicated with said first passage within said members, said housing having a fluid inlet second passage communicating with said first passage within said center member and communicating with the outermost of said grooves on the faces of each of said intermediate members adjacent said center member, said housing having a fourth passage venting the outermost groove of the face of said first intermediate member which is adjacent said first end member and having a fifth passage venting the corresponding groove of said second intermediate member, said housing having a sixth passage connecting the middle grooves on each face of said first intermediate member and connecting with a first outlet and a seventh passage connecting the middle grooves on each face of said second intermediate member and connecting with a second outlet, said housing having an eighth passage connecting the outermost groove of said first end member with the outermost groove of the most distant face of said center member and having a ninth passage connecting the outermost groove of said second end member with the outermost groove of the most distant face of said center member, said housing having a constricted tenth passage connecting said eighth passage with said first passage within said first intermediate member and having a constricted eleventh passage connecting said ninth passage with said first passage within said second intermediate housing member, four flexible diaphragms each being disposed between an adjacent pair of housing members and spanning said grooves thereof, a first normally closed bleed valve communicated with said first passage within said first intermediate housing member and a second normally closed bleed valve communicated with said first passage within said second intermediate housing member.

9. A four-way fluid pressure operated valve comprising, in combination, a housing formed by a first flat end member, a flat center member and a flat second end member secured together in stacked relationship, said housing being transpierced by first and second passages which extend through said first end member and said center member and partially into said second end member, each of the facing surfaces of said housing members having a first set of three annular grooves formed therein concentric with said first passage and having a second set of three annular grooves formed therein concentric with said second passage, said grooves of each set being of progressively increased diameter, said three grooves of each set on said first and second end members being intercommunicated, the innermost groove of each of said first sets thereof on said center member being communicated with said first passage and the innermost groove of each of said second sets thereof on said center member being communicated with said second passage, said housing having a third fluid inlet passage communicating with said first and second passages within said second end member and with the outermost groove of said first and second sets thereof on the face of said center member adjacent said second end member, said housing having a fourth passage venting the outermost groove of the first set on the face of said center member adjacent said first end member and having a fifth passage venting the outermost groove of said second set on the same face of said center member, said housing having a sixth passage connecting the middle grooves of said first set on each face of said center member and connecting with a first outlet, said housing having a seventh passage connecting the middle grooves of said second set on each face of said center member and connecting with a second outlet, said housing having an eighth passage connecting the middle groove of said first set of said first end member with the outermost groove of said second set of said second end member and having a ninth passage connecting the middle groove of said second set on said first end member with the outermost groove of said first set on said second end member, said housing having a constricted tenth passage connecting said eighth passage with said first passage within said center member and having a constricted eleventh passage connecting said ninth passage with said second passage within said center member, a pair of flexible diaphragms one disposed between said first end member and said center member and one disposed between said second end member and said center member, said diaphragms spanning all of said grooves on said members, a first normally closed bleed valve communicated with said first passage within said center member, and a second normally closed bleed valve communicated with said second passage within said center member.

10. A four-way fluid pressure operated valve comprising, in combination, a housing formed by a flat center member and first and second end members secured against opposite sides thereof in stacked relationship therewith, said housing being transpierced by a first passage which extends through each of said members thereof and which has a first enlarged section on each side of the center of said center member and a section of intermediate diameter outward from each of said enlarged sections and a second enlarged section outward from each of said intermediate sections and at the surfaces of said center member, said center member of said housing having four annular grooves on each face which grooves are concentric with said first passage and of progressively increased diameter, each of said end members of said housing having two concentric annular grooves on the face adjacent said center member the innermost of which spans the two innermost grooves on the adjacent face of said center member and the outermost of which spans the two outermost grooves on said face of the center member, said two grooves of each of said end members being intercommunicated, said housing having a second passage forming a fluid inlet and communicating with said first passage within said center member, said housing having third and fourth passages each venting one of said second enlarged sections of said first passage, said housing having a fifth passage connecting the innermost of said grooves at each face of said center member with said second passage, said housing having a sixth passage connecting the second innermost of said grooves at the face of said center member adjacent said second end member with the second outermost of said grooves on the opposite face of said center member and connecting with a first fluid outlet, said housing having a seventh passage connecting the second outermost of said grooves at the face of said center member adjacent said second end member with the second innermost of said grooves on the opposite face of said center member and connecting with a second outlet, said housing having an eighth passage venting the outermost of said grooves on the face of center member adjacent said first end member and having a ninth passage venting the corresponding groove on the opposite face of said center member, said housing having a tenth passage connecting the innermost groove of said first end member with the most distant of said first enlarged sections of said first passage and connecting with said first passage within said first end member through a flow constriction, said housing having an eleventh passage connecting the innermost groove of said second end member with the most distant of said first enlarged sections of said first passage and connecting with said first passage within said second end member through a flow constriction, a pair of discs each disposed in a separate one of said first enlarged sections of said first passage, a pair of flexible diaphragms one being disposed between said first end member and said center member and the other being disposed between said second end member and said center member, said diaphragms spanning said grooves of said housing members and each having a projection extending through said intermediate sections of said first passage, and a pair of normally closed bleed valves each communicated with said first passage at opposite ends of said housing.

11. A four-way fluid pressure operated valve comprising, in combination, a housing formed by a center member having opposite flat surfaces and having a first end member secured against a first of said surfaces and a second end member secured against the second of said surfaces, said housing being transpierced by a passage which extends through each of said members thereof and which has a first enlarged section on each side of the center of said center member and a section of intermediate diameter outward from each of said first enlarged sections and a second enlarged section outward from each of said intermediate sections and at said first and second surfaces of said center member, said center member of said housing having adjacent first and second grooves and adjacent third and fourth grooves on each of said first and second surfaces and each of said end members of said housing having four grooves conforming in configuration and placement to said grooves on the adjacent face of said center member, the first and second grooves on each of said end members being intercommunicated and the second and third grooves thereon being intercommunicated, said housing having a second passage forming a fluid inlet and connecting with said first passage between said enlarged sections thereof, said housing having third and fourth passages each venting one of said second enlarged sections of said first passage, said housing having a fifth passage connecting said second groove at said first surface of said center member with said second passage and having a sixth passage connecting said third groove of said second surface of said center member with said second passage, said housing having a seventh passage connecting said first grooves at each surface of said center member with a first fluid outlet and having an eighth passage connecting said fourth grooves at each surface of said center member with a second fluid outlet, said housing having a ninth passage venting said third groove at said first surface of said center member and having a tenth passage venting said second groove at said second surface thereof, said housing having an eleventh passage connecting said third groove of said first end member with the most distant of said first enlarged sections of said first passage and connecting with said first passage within said first end member through a flow constriction, said housing having a twelfth passage connecting said second groove of said second end member with the most distant of said first enlarged sections of said first passage and connecting with said first passage within said first end member through a flow constriction, a pair of discs each disposed in a separate one of said first enlarged sections of said first passage, a pair of flexible diaphragms one being disposed between said center member and said first end member and the other being disposed between said center member and said second end member, said diaphragms spanning said grooves of said housing members and each having a projection extending through said intermediate sections of said first passage, and a pair of normally closed bleed valves each communicated with said first passage at opposite ends of said housing.

12. In a construction for a valve which is to perform a plurality of valving functions, the combination comprising a plurality of flat housing members secured together in stacked relationship, said members having a separate adjacent pair of grooves formed on a surface thereof for each of said valving functions which is to be performed and having a separate recess formed on the adjacent surface of the neighboring one of said members for each of said pair of grooves which recess spans said pair of grooves, said members having a fluid inlet passage connecting with at least one of said grooves and a plurality of outlet passages each connecting with a separate one of said grooves and having internal passages interconnecting selected ones of said grooves for inter-relating said plurality of valving functions, said housing having a plurality of pilot pressure passages one connecting with each of said recesses, and a plurality of flexible diaphragms each being disposed between an adjacent pair of said housing members and spanning said grooves and recesses thereof to hermetically isolate each recess from the associated pair of grooves whereby the controlled admission of high pressure fluid to selected ones of said pilot passages acts to distend selected areas of said diaphragms and block communication between selected ones of said pairs of grooves.

13. A valve construction as described in claim 12 wherein said housing members are provided with a plurality of additional passages each connecting a selected one of said recesses with said fluid inlet passage through a flow constriction whereby communication between the pair of grooves associated with said recess will be normally closed and may be opened by the venting of the one of said pilot passages which is associated with said recess.

References Cited in the file of this patent

UNITED STATES PATENTS

| | | |
|---|---|---|
| 2,376,918 | Hughes | May 29, 1945 |
| 2,984,257 | McCormick et al. | May 16, 1961 |